No. 881,563. PATENTED MAR. 10, 1908.
W. L. R. EMMET.
BRAKE FOR ELASTIC FLUID TURBINES.
APPLICATION FILED JULY 9, 1904.
2 SHEETS—SHEET 1.
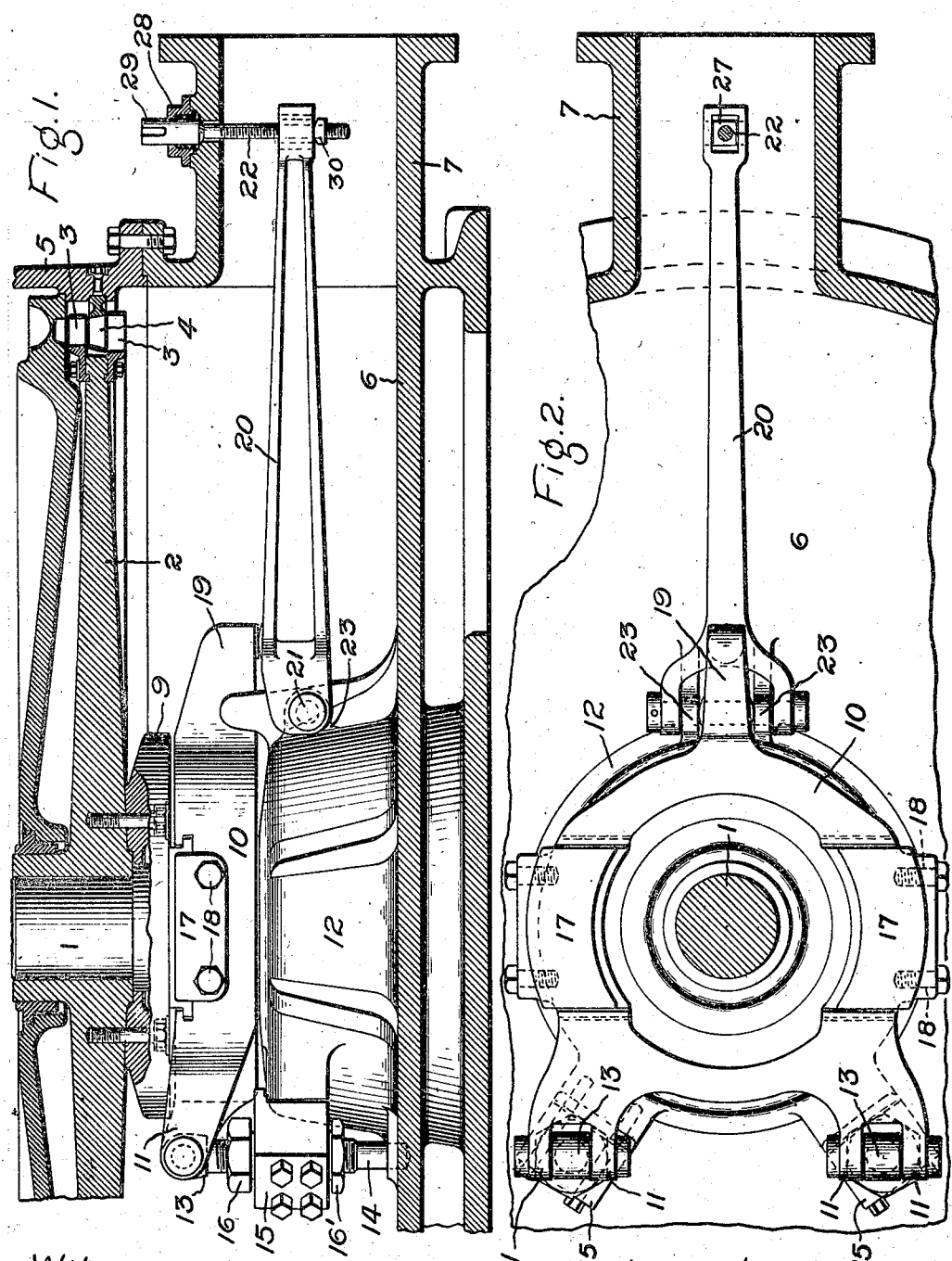
Witnesses:
Inventor:
William L. R. Emmet,
by
Atty.

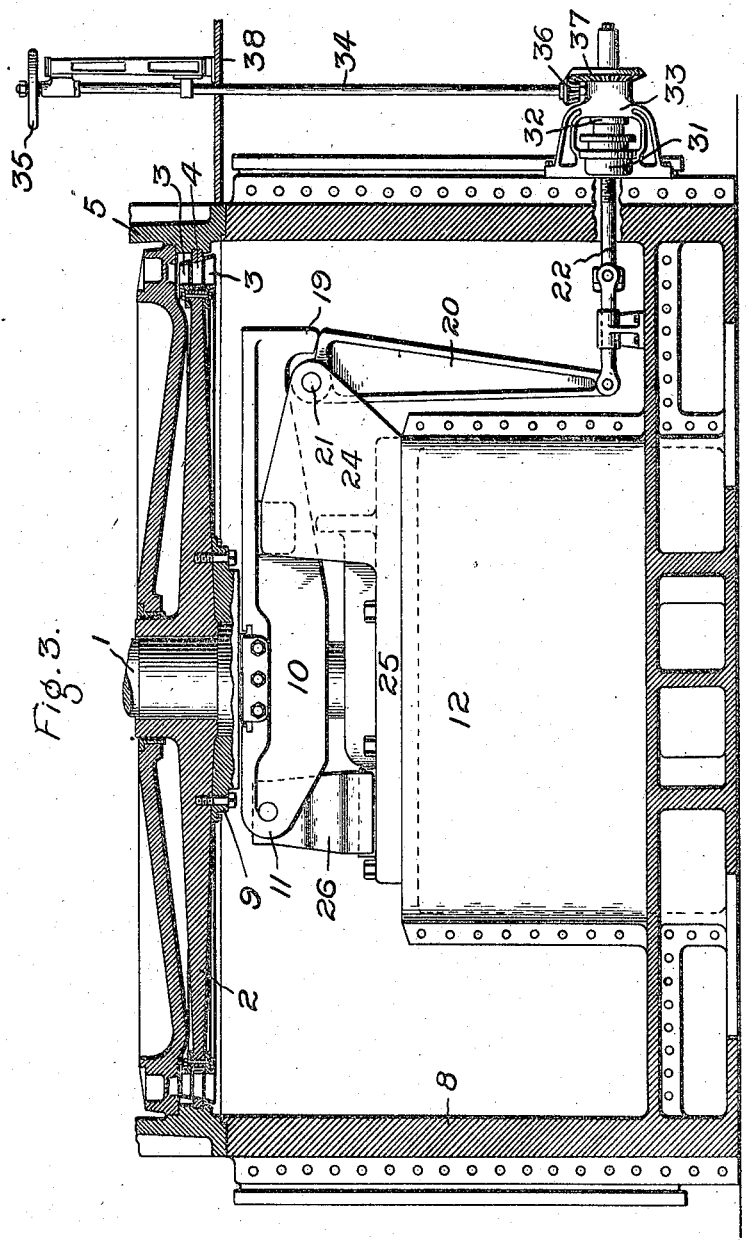

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

BRAKE FOR ELASTIC-FLUID TURBINES.

No. 881,563.      Specification of Letters Patent.      Patented March 10, 1908.

Application filed July 9, 1904. Serial No. 215,868.

*To all whom it may concern:*

Be it known that I, WILLIAM L. R. EMMET, a citizen of the United States, residing at Schenectady, in the county of Schenectady and State of New York, have invented certain new and useful Improvements in Brakes for Elastic-Fluid Turbines, of which the following is a specification.

This invention relates to turbine engines operated by fluid pressure, and its object is to provide an improved brake by which the machine can be quickly brought to rest after the steam or other elastic fluid has been shut off. Some such device is essential in the case of a large turbine, which if left to itself will spin a long time after the main throttle has been closed.

The present invention is an improvement upon the braking devices heretofore used and its purpose is to simplify the construction and provide a strong, powerful brake which can be easily operated by one man. To this end, a movable member carrying brake-shoes is hinged at a point at one side of the shaft, and at the opposite side is engaged by a lever which can be actuated by a screw to apply or release the brake.

In the accompanying drawings, Figure 1 is a side elevation of my improved brake as applied to a vertical turbine, a portion of the turbine wheel and casing being shown in section; Fig. 2 is a top plan view of the brake, the shaft and a part of the casing being in section; and Fig. 3 is a sectional side elevation showing a modification.

In the upright turbine which I have selected to illustrate my invention, the shaft 1 carries the horizontal wheel 2 on which are mounted the buckets 3 which alternate with the stationary intermediates 4, supported by the casing 5.

In Fig. 1 the base 6 of the casing has at one side a flanged nozzle 7 for leading off the exhaust steam to a condenser. In Fig. 3 the base 8 is higher, and constitutes itself a condenser; as fully disclosed in my pending application filed Sept. 14, 1903, Serial Number 173,027. In either case, the wheel 2 is at the top of a chamber into which the steam exhausts, and in which is placed the brake mechanism, which will now be described.

The wheel 2 is preferably provided with a wear-plate 9 fastened to the bottom of the wheel concentric with the shaft, with its under surface lying in a plane of revolution. Immediately below this is located an annular frame 10 surrounding the shaft and having at one side thereof ears 11 which are hinged to suitable bearings supported on the casing 12 in which is located the step-bearing.

In Figs. 1 and 2, the ears are hinged to the heads 13 of stout upright bolts 14 which are suitably supported on the casing 12. The supports are preferably blocks 15 bolted to faces on the side of the casing and each containing a smooth hole to receive and guide its bolt. The object of using blocks 15 separate from the casing 12 and fastened thereto is simply to facilitate the machining of these parts. A nut 16 on the bolt rests on the block and enables the hinge to be adjusted vertically in order to bring the brake-shoes exactly parallel with the surface of the wear-plate. A lock nut 16' secures the bolt when adjusted. The frame carries on its upper side two or more brake-shoes 17, which are suitably secured to the frame, as by screws 18, and have flat top faces to bear against the plane under surface of the wear-plate 9.

Various arrangements of operating mechanism may be employed, but I prefer to provide the frame with a nose 19 on the side opposite the hinges, and to place under this nose a lever 20 fulcrumed at 21 near the point of contact with the nose, and having a long arm which can be moved by a screw 22. In Figs. 1 and 2, the lever is fulcrumed on lugs 23 cast on the casing 12. In Fig. 3, it is pivoted in a bracket 24 projecting from a base 25 resting on the top of the reëntrant chamber or casing 12 for the step-bearing. This base 25 also supports a pedestal 26 to which the frame 10 is hinged.

In Figs. 1 and 2, the long arm of the lever may conveniently extend into the nozzle 7 where it carries a nut 27 meshing with the screw 22, the latter passing through a stuffing-box 28 on the nozzle and having a head 29 to receive a wrench. A nut 30 on the screw serves as a stop to limit the lowering of the lever when the brake is released. In Fig. 3, the long arm of the lever runs down toward the bottom of the condenser-base. The screw is hinged to its lower end, and extends horizontally through a stuffing-box 31 to the outside of the base where it meshes with a nut 32 rotatable in a stationary bracket 33. The nut is preferably rotated by a shaft 34 provided with a hand-wheel 35 and a pinion 36 which meshes with a gear 37 on the nut. If the condenser-base is below the floor 38 of the engine-room, the shaft 94 is an upright one, as shown.

The operation of the device is obvious. When the steam has been shut off, the operator rotates the screw to cause the lever to move the frame and bring the brake-shoes into contact with the revolving wear-plate, thereby rapidly slowing down and stopping the engine.

In the case of a vertical turbine, the brake can be used to lift the shaft off the step-bearing and support it while the latter is being removed and replaced, should this be necessary for purposes of repair.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In an elastic fluid turbine, the combination with the casing, of a shaft entering the same, a bearing for the shaft, an element rotating with the shaft and affording a brake surface inside said casing, a frame surrounding said shaft and hinged at one side thereof and provided with a brake surface coöperating with that on the shaft, and means acting on the side of the frame opposite the hinge for moving said frame from outside said casing and causing it to brake the element and at the same time relieve the pressure on the bearing.

2. In an elastic fluid turbine, the combination with the casing, of a shaft entering the same, a bearing for the shaft, a brake element rotating with said shaft inside said casing, a frame surrounding said shaft and hinged at one side, brake shoes on said frame to act on the rotating element, a lever separate from and engaging the frame on one side for raising it in a manner to cause the shoes to engage and relieve the pressure on the bearing, and means for actuating said lever from outside the casing.

3. In an elastic fluid turbine, the combination with the casing, of a shaft entering the same, a bearing for the shaft, a brake element secured to said shaft inside said casing, a frame surrounding the shaft and hinged at one side thereof, brake shoes carried by the frame and acting on said brake element, a lever independent of the frame and the shoes for moving them, a pivot for the lever, and a screw for actuating said lever, said screw passing through the casing.

4. In an elastic-fluid turbine, the combination with a shaft, of an element rotating therewith, a casing for the element, a frame surrounding said shaft and hinged at one side, brake-shoes on said frame to act on the rotating element, a lever for moving the frame, a screw for actuating said lever, and means for operating said screw from a point outside the casing of the turbine.

5. In an elastic-fluid turbine, the combination with a shaft, of an element rotating therewith and having a brake-surface in a plane of revolution, a frame carrying brake-shoes to coöperate therewith, hinges supporting said frame, and means for adjusting each hinge separately.

6. In an elastic-fluid turbine, the combination with the shaft, of an element rotating therewith and having a brake-surface in a plane of revolution, a frame carrying brake-shoes to coöperate therewith, said frame having lugs thereon, bolts having heads hinged to said lugs, stationary supports for guiding said bolts, and nuts for adjusting said bolts lengthwise in said supports.

7. In a turbine, a closed casing, a revolving element and a step bearing, in combination with a ring pivoted at one side of the axis of the element for supporting it when the step bearing is removed, an independently supported lever for tilting the ring, and means controllable from a point outside of the casing for moving the lever and causing engagement of the ring and revolving element.

In witness whereof, I have hereunto set my hand this 8th day of July, 1904.

WILLIAM L. R. EMMET.

Witnesses:
  BENJAMIN B. HULL.
  HENRY ORFORD.